(12) United States Patent
Qian et al.

(10) Patent No.: US 9,494,251 B2
(45) Date of Patent: Nov. 15, 2016

(54) TWO-WAY VALVE WITH SECURE STRUCTURE FOR DISPENSING LARGE BOTTLE OF CARBONATED BEVERAGE INTO VIAL

(71) Applicants: Davy Zide Qian, Arcadia, CA (US); Benyu Qian, Shanghai (CN); Lequn Lu, Shanghai (CN)

(72) Inventors: Davy Zide Qian, Arcadia, CA (US); Benyu Qian, Shanghai (CN); Lequn Lu, Shanghai (CN)

( * ) Notice: Subject to any disclaimer, the term of this patent is extended or adjusted under 35 U.S.C. 154(b) by 40 days.

(21) Appl. No.: 14/504,633

(22) Filed: Oct. 2, 2014

(65) Prior Publication Data

US 2016/0096656 A1   Apr. 7, 2016

Related U.S. Application Data

(60) Provisional application No. 61/887,341, filed on Oct. 5, 2013.

(51) Int. Cl.

| B65D 25/38 | (2006.01) |
|---|---|
| *F16K 5/06* | (2006.01) |
| *F16K 31/60* | (2006.01) |
| *F16K 27/04* | (2006.01) |
| B65D 1/02 | (2006.01) |
| B67D 3/04 | (2006.01) |

(52) U.S. Cl.
CPC .............. *F16K 31/60* (2013.01); *B65D 1/023* (2013.01); *B65D 25/38* (2013.01); *F16K 5/0668* (2013.01); *F16K 27/041* (2013.01); *B67D 3/047* (2013.01)

(58) Field of Classification Search
CPC .. F16K 5/0621; F16K 5/0663; F16K 5/0684; F16K 5/0689; F16K 5/0694; F16K 27/06; F16K 27/061; F16K 5/0668; F16K 27/067; F16K 31/60; B65D 25/38; B65D 1/023; B65D 1/0246
USPC ...................................... 137/315.18
See application file for complete search history.

(56) References Cited

U.S. PATENT DOCUMENTS

| 652,992 A | * | 7/1900 | Arnold | .................. | G01F 11/263 134/94.1 |
|---|---|---|---|---|---|
| 5,909,824 A | * | 6/1999 | Qian | ..................... | G01F 11/263 222/1 |

* cited by examiner

*Primary Examiner* — Kevin Lee
(74) *Attorney, Agent, or Firm* — Global IP Services; Tianhua Gu

(57) ABSTRACT

A two-way valve with secure structure for dispensing a large bottle of carbonated beverage into a vial comprises a valve body, valve spool, handle and bottle seal ring. The valve body has an inlet with an inner thread which matches an external thread of the large bottle and has an outlet with an inner thread which matches an external thread of the vials. The secure structure is an axial annular groove recessed axially into bottoms of the inner threads of the inlet and outlet of the valve body, one side of the axial recessed annular groove is the inner thread which extends to a bottom of the groove and other side is a groove wall, The bottle secure seal ring is deposited in the annular groove. Since the depth of the axial annular groove is greater than a thickness of the bottle seal ring, the outgoing pressure gas cannot reach the bottle seal ring.

10 Claims, 3 Drawing Sheets

TWO-WAY VALVE WITH SECURE STRUCTURE FOR DISPENSING LARGE BOTTLE OF CARBONATED BEVERAGE INTO VIAL

CROSS REFERENCE TO RELATED PATENT APPLICATION

The present application claims the priority of U.S. Ser No. 61/887,341 filed on Oct. 5, 2013, which application is incorporated herein by reference.

FIELD OF THE INVENTION

The present invention pertains to a food container.

BACKGROUND OF THE INVENTION

Individuals or families to buy a large bottle of carbonated beverage often need several times to finish it, so the cap should always be opened, causing a gas leak drinks. Beverage in the bottle often there are many, but the gas has leaked to the utmost, seriously affecting the carbonated beverage quality. The U.S. Pat. No. 5,909,824 solves this problem, but the structure is much complex, production cost is high, these bring marketing difficulties.

Because the large bottle of carbonated beverage is sold in a huge market, to provide a cheap tool with good function for preventing gas leak during several drinks for the large bottle of carbonated beverage is necessary. The present invention of two-way valve with secure structure for dispensing large bottle of carbonated beverage into Vial is one such tool.

SUMMARY OF THE INVENTION

Concept of the invention is the use of two-way valve to connect the large bottle of carbonated beverage bottle and vial, open two-way valve, the carbonated beverage will be poured into a vial, and then close the two-way valve, allowing two-way valve to stay on the large bottle of carbonated beverage, take the vial of carbonated beverage away for a good drink, so you can make large gas bottle of carbonated beverage to keep gas remained to the end. Test results of a sample of the present invention prove that the idea is feasible.

Found during the test, the bottle seal ring would be blown out fast by the gas pressure. Accidentally the bottle seal ring hits drinker's eye, it is very dangerous. Therefore, increasing a secure structure to the two-way valve for preventing the bottle seal ring be blown out by pressure gas is very important.

A two-way valve with secure structure for dispensing a large bottle of carbonated beverage into a vial comprises a valve body, valve spool, handle and bottle seal ring; the valve body has an inlet with an inner thread which matches an external thread of the large bottle and has an outlet with an inner thread which matches an external thread of the vials; bottoms of the inner threads of the inlet and outlet of the valve body have a secure structure respectively for preventing the bottle seal ring being blown out by pressure gas.

The secure structure is an axial annular groove recessed axially into bottoms of the inner threads of the inlet and outlet of the valve body, one side of the axial annular groove is the inner thread which extends to a bottom of the axial annular groove and other side is a groove wall, a depth of the axial annular groove is greater than a thickness of the bottle seal ring, a width of axial the annular groove is greater than a width of the external thread of the bottle.

The secure structure is a radial annular groove recessed radially into a root segment of the inner threads of the inlet and outlet of the valve body.

The axes of the inlet and outlet of the valve are vertical to each other or are at an obtuse angle.

The two-way valve with secure structure is a ball valve.

DETAIL DESCRIPTION OF THE INVENTION

Figure 1:
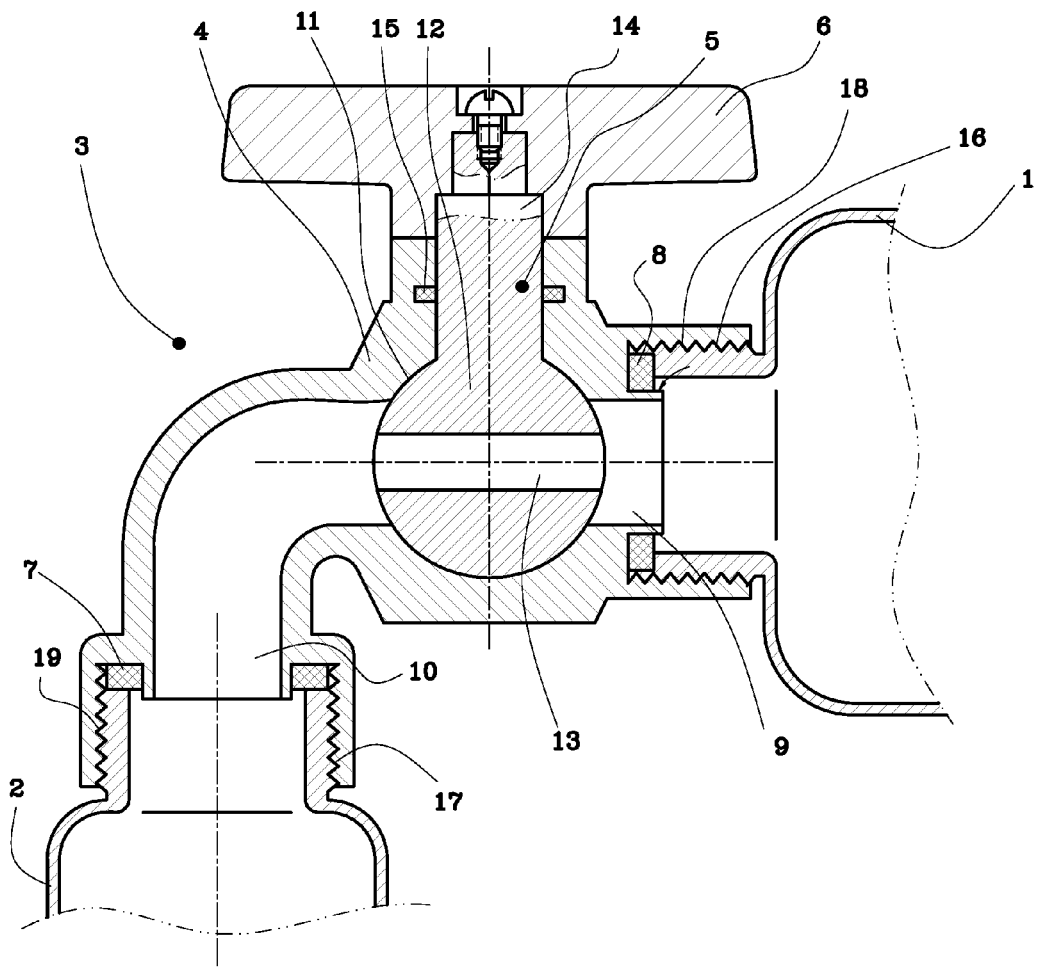
FIG. 1 is a schematic figure for the present invention of a two-way valve with secure structure for dispensing a large bottle of carbonated beverage into a vial, its inlet is connected with a large bottle of carbonated beverage and its outlet is connected with a vial of carbonated beverage.

As shown in FIG. 1, a two-way valve with secure structure for dispensing a large bottle of carbonated beverage into a vial, which includes a valve body 4, valve spool 5, handle 6, and bottles seals 7 or 8.

The valve Body 4 has an inlet 9, outlet 10 and valve chamber 11, passages communicates the inlet 9, outlet 10 and valve chamber 11 together. The spool core 12 of the valve spool 5 is in the valve chamber 11 and is rotatable in the valve chamber 11. The valve spool 5 has a through hole 13 and a vale spool stem 14. The vale spool stem 14 extends to outside of the valve body 4, equipped with the handle 6. There is a seal ring 15 between the valve spool stem 14 and vale body 4. The inlet 9 and outlet 10 have an inner threaded 16 or 17 respectively, the inner thread 16 of the inlet matches the outer thread 18 of the large beverage bottles, the inner thread 17 of the outlet matches the outer thread of the small bottles.

At the bottoms of the inner threads of the inlet and outlet there are secure structure for preventing the bottle seal ring being blown out by pressure gas. The secure structures for the inlet and outlet are the same.

The axes of the inlet 9 and outlet 10 of the valve body are vertical to each other or at an obtuse angle.

Figure 2:
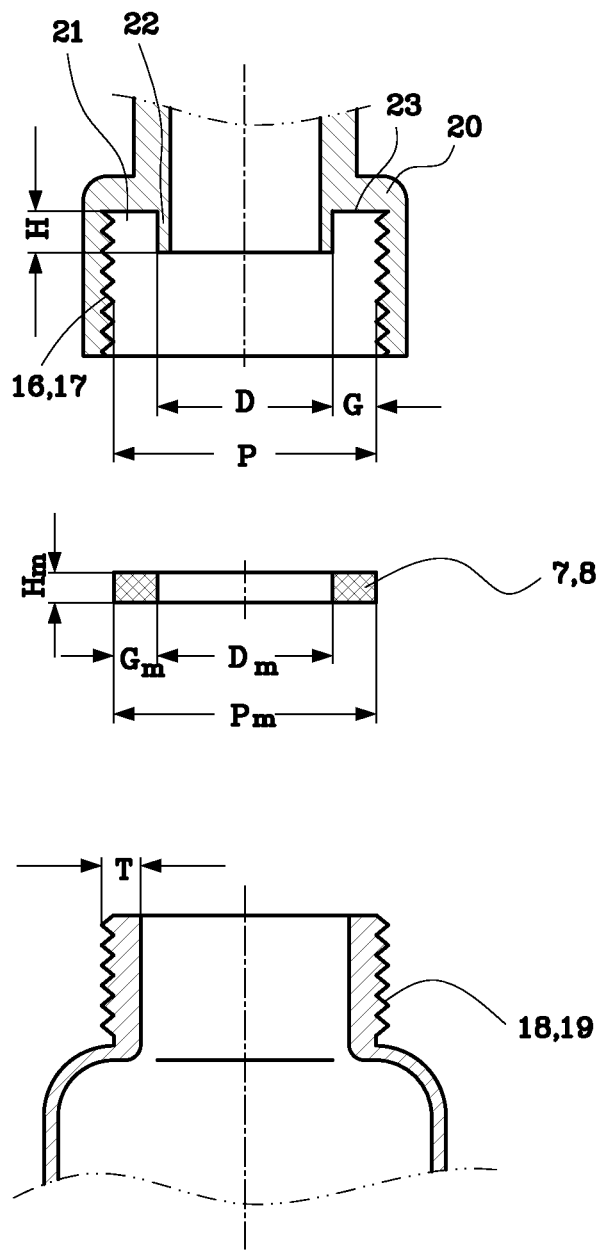
FIG. 2 is a schematic figure showing the secure structure for preventing the pressure gas blowing the bottle seal ring out.

As shown in FIG. 2, the secure structure 20 is an axial annular groove 21 recessed axially into bottoms of the inner threads 16 or 17 of the inlet and outlet of the valve body, one side of the axial annular groove 21 is the inner thread 16 or 17 which extends to a bottom 23 of the groove 21 and other side is a groove wall 22, a depth H of the axial annular groove 21 is greater than a thickness Hm of the bottle seal ring 7 or 8, a width G of the axial annular groove 21 is greater than a width T of the external thread of the bottle.

The axial annular groove 21 has bottle seal ring 7, 8 which is made by resilient plastic. The wide Gm of the bottle seal ring 7, 8 is tight fit with the wide G of the axial annular groove 21. The outer diameter Pm of the seal ring 7, 8 is equal to the inner diameter P of the inner thread 16, 17. The inner diameter Dm of the seal ring 1, 8 is larger than the outer diameter D of the wall 22 of the axial annular groove 21.

The axial annular groove 21 has a rectangular cross-section, the bottle seal ring 7 or 8 has a rectangular cross section too. Also, the axial annular groove 21 has a rectangular cross section, but the seal ring 7 or 8 has a circular cross section.

Since the depth H of the axial annular groove 21 is larger than the thickness Hm of the bottle seal ring 7 or 8, the pressure of the discharge gas cannot blow the bottle seal 7 or 8, then ensure the bottle seal 7 or 8 being not blown out.

Figure 3:
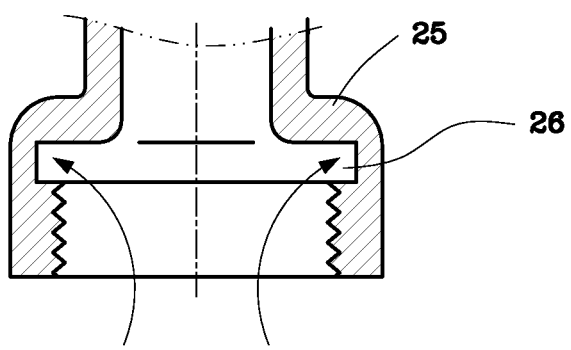
FIG. 3 is another secure structure for preventing the pressure gas blowing the bottle seal ring out.
Figure 3:
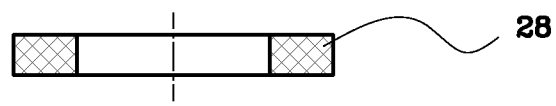

As shown in FIG. 3, the insure structure 25 has a different structure. The insure structure 25 is a radial annular groove 26 recessed radially into a root segment of the inner threads of the inlet and outlet of the valve body. The bottle seal ring 28 is made of elastic plastic, having a thickness less than the width of the radial annular groove, having an outer diameter larger than the inner diameter of the inner thread, having an inner diameter smaller than the inner diameter of the bottle. Because the bottle seal ring is embedded into the radial annular groove 26, so that the pressure gas cannot blow the bottles seal 228 ring moving.

The inner threads 16, 17 of the inlet, outlet of the valve body are made according to the beverage bottle standard of the International Society Beverage Technologists. For two liters or less carbonated beverage bottles the outer thread standard is PCO standard 28 mm neck finish and the outer thread size is the same.

The using method of the present invention is to open a large bottle of carbonated beverage, the inlet of the two-way valve is tightened on the large bottle of carbonated beverage, the outlet of the two-way valve is tightened on the vial, and open the two-way valve to pour beverage into the vials from large bottle, and then close the two-way valve, allow the two-way valve to stay on the large bottle of carbonated beverage bottles, take a good drink vial filling, so filling on the end points. Because the two-way valve closing the large bottle of carbonated beverage, so the pressure gas can be fully retained to the drinks finally run out, there is still a very high pressure.

What is claimed is:

1. A two-way valve for dispensing a bottle of carbonated beverage into a vial comprising:
    a valve body, a valve spool, a handle and a bottle seal ring;
    the valve body has an inlet with an inner thread which matches an external thread of a bottle of carbonated beverage and has an outlet with an inner thread which matches an external thread of a vial;
    bottoms of the inner threads of the inlet and outlet of the valve body have a structure respectively for preventing the bottle seal ring being blown out by pressure gas.

2. The two-way valve of claim 1, wherein the structure for preventing the bottle seal ring being blown out by pressure gas is an axial annular groove recessed axially into bottoms of the inner threads of the inlet and outlet of the valve body, one side of the axial annular groove is the inner thread which extends to a bottom of the axial annular groove and other side is a groove wall, a depth of the axial annular groove is greater than a thickness of the bottle seal ring, a width of axial the annular groove is greater than a width of the external thread of the bottle of carbonated beverage or the vial.

3. The two-way valve of claim 2, wherein the axial annular groove has a rectangular cross-section, the bottle seal ring has a rectangular cross section too, the bottle seal ring is made of elastic plastic, a width of the bottle seal ring and the width of the axial annular groove are made into tight fit.

4. The two-way valve of claim 1, wherein the structure for preventing the bottle seal ring being blown out by pressure gas is a radial annular groove recessed radially into a root segment of the inner threads of the inlet and outlet of the valve body.

5. The two-way valve of claim 4, wherein the bottle seal ring is made of elastic plastic, a thickness is less than the a width of the radial annular groove, an outer diameter is greater than an inner diameter of the inner threads of the inlet and outlet of the valve body.

6. The two-way valve of claim 1, wherein a sealing ring is provided between a stem of the valve spool and the valve body.

7. The two-way valve of claim 1, wherein axes of the inlet and outlet of the valve are vertical to each other or are at an obtuse angle.

8. The two-way valve of claim 1, wherein the two-way valve is a ball valve.

9. The two-way valve of claim 8, wherein the valve body and the valve spool are made of plastic, the valve body is made by integrally injection molded manufacture, the valve spool is wrapped in a cavity of the valve body and is rotatable.

10. The two-way valve of claim 1, wherein the inlet and outlet of the valve have inner thread with same size.

* * * * *